United States Patent [19]

Winders

[11] 4,424,802

[45] Jan. 10, 1984

[54] PNEUMATIC DRIVE FOR SOLAR CONCENTRATORS

[75] Inventor: Gordon R. Winders, Oak Ridge, Tenn.

[73] Assignee: Sun Trac Industries, Inc., Oak Ridge, Tenn.

[21] Appl. No.: 309,812

[22] Filed: Oct. 8, 1981

[51] Int. Cl.³ ............................................... F24J 3/02
[52] U.S. Cl. ..................... 126/425; 126/438;
126/439; 250/203 R; 353/3; 350/289
[58] Field of Search ............... 126/425, 424, 438, 439;
350/289, 288; 353/3; 250/203 R, 236, 235, 234

[56] References Cited

U.S. PATENT DOCUMENTS

| | | | |
|---|---|---|---|
| 1,951,404 | 3/1934 | Goddard | 126/425 |
| 2,712,772 | 7/1955 | Trombe | 126/425 X |
| 2,896,476 | 7/1959 | Williams | 353/3 X |
| 3,533,701 | 10/1970 | Hruby et al. | 350/289 X |
| 3,624,818 | 11/1971 | Stanfield | 350/289 |
| 3,769,608 | 10/1973 | Vargady | 372/15 |
| 4,135,493 | 1/1979 | Kennedy | 126/425 |
| 4,147,414 | 4/1979 | Raser | 350/289 |
| 4,179,612 | 12/1979 | Smith | 126/425 |
| 4,211,212 | 7/1980 | Braun | 126/425 X |
| 4,278,427 | 7/1981 | Lingenhöle et al. | 91/59 |
| 4,318,394 | 3/1982 | Alexander | 350/288 X |

*Primary Examiner*—Larry Jones
*Attorney, Agent, or Firm*—Pitts, Ruderman & Kesterson

[57] ABSTRACT

A method and apparatus for driving an array or large field of solar concentrators (10) by means of pneumatic pulses of compressed air such that it tracks the movement of the sun (14) across the sky is disclosed. The drive system includes a multiplicity of gearing means (26) which is mounted to one or more solar concentrators (10) for providing the movement of said solar concentrators to track the sun (14). The multiplicity of gearing means are driven by a multiplicity of drive means (28) in response to pulses of compressed air which are selectively provided to achieve the necessary tracking. The pulses of compressed air are provided to the drive (26) means from a compressed air source (38) by means of pneumatic valving (32) which is selectively opened and closed by means of electrical drive signals. The compressed air is connected to the pneumatic valving (32) and then further connected to the drive means (26) by means of fluid conduits (34) such as for example, plastic tubing. Suitable control circuitry (40) such as electrical relays (58) and (60) or other electronic switching circuitry provides the electrical drive signals to the pneumatic valving (32). The control circuitry (40) itself operates in response to electrical control signals received from any suitable sensing means (46) which can monitor the movement of the sun across the sky.

12 Claims, 4 Drawing Figures

U.S. Patent    Jan. 10, 1984    Sheet 1 of 2    4,424,802
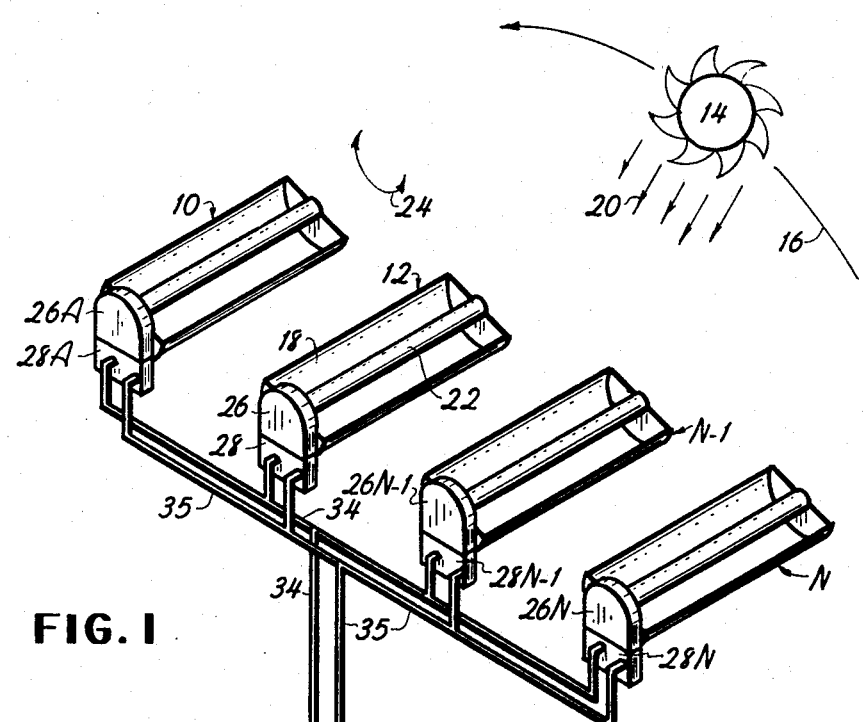
FIG. 1
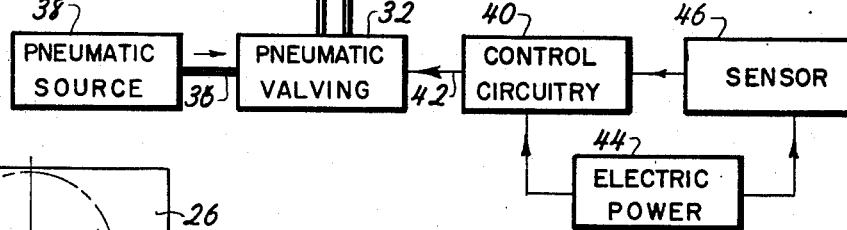
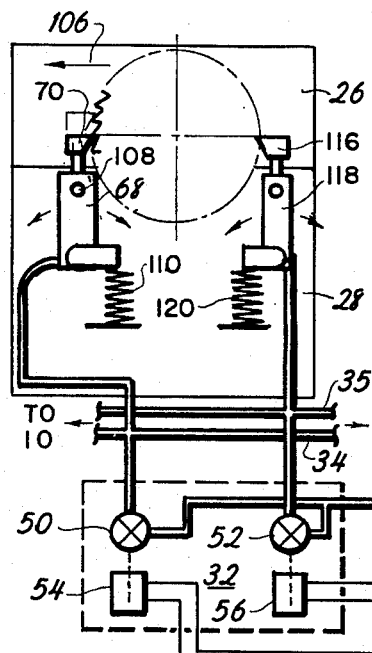
FIG. 2
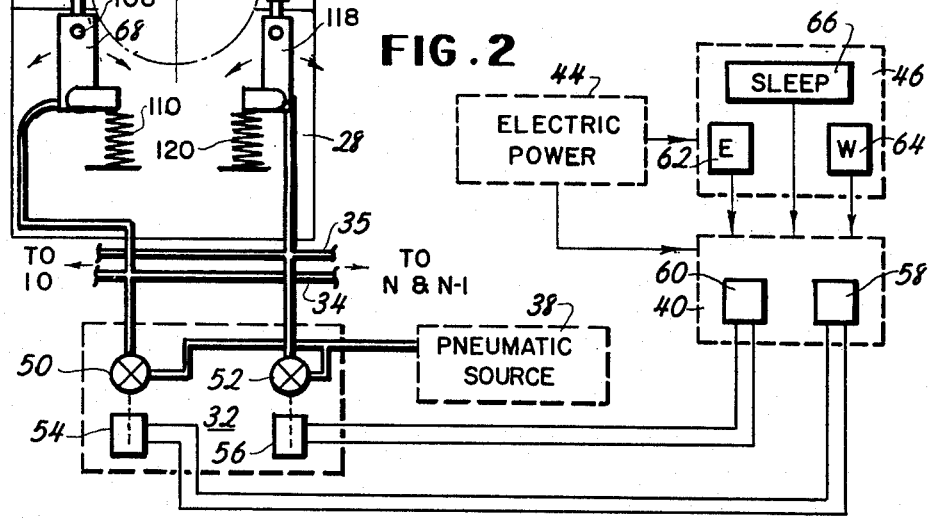

PNEUMATIC DRIVE FOR SOLAR CONCENTRATORS

DESCRIPTION

1. Technical Field

This invention relates generally to a tracking system for moving solar energy concentrators for purposes of tracking the sun as the sun moves across the sky. In particular, the methods and apparatus of this invention relate to a drive system for synchronously moving a large field of solar concentrators with precision by means of pneumatic pulses. The use of pneumatic pulses or compressed air for driving a large field of solar concentrators in a tracking mode provides an inexpensive and substantially maintenance free drive system which can continue to operate from a supply of compressed air to allow for detracking or shut down in the event of a power failure.

2. Background Art

In this period of critical energy shortages, the nation's attention is being directed towards the development of new and plentiful sources of energy. Sources of energy although not new, but which are becoming of great significance are coal and solar energy. Coal, of course, has always been used as a primary fuel in the generation of electrical energy and other industrial processes. However, it is often dirty, contains objectionable materials upon burning, often requires expensive processing, and simply is not suitable for all uses. Solar energy on the other hand is completely free, is very clean, and represents a vast untapped source of energy which because of the present economic conditions is proving to be an effective conventional source. Therefore, solar energy unlike natural gas and other petroleum products, now represents a very reliable source of energy. There are, of course, many types of solar collecting systems which have been used and developed in the past. Such systems include tubes, plates, and other large surface areas which simply contain some type of fluid that is heated by placing the collector or the device in the sun. Unfortunately, such devices are suitable for low temperature applications only, require great amounts of space, and are relatively expensive. Thus, the use of these large collectors is unattractive because of the small return received for the large capital investment which must be made. Consequently, recently the nation's attention has been directed towards improved types of solar energy systems which use collectors to gather the energy and concentrate the energy into a relative small area or target to achieve high temperatures. The use of reflective surfaces such as parabolic reflectors and other curved type surfaces are effective for focusing or concentrating the radiation onto the desired area. To effectively use these type collectors, however, it is necessary that the solar collectors be positioned as accurately as possible to receive the sun's rays directly. One technique which has been used in the past is to fixedly position the solar collectors so the collector will receive a maximum amount of the sun's ray during the course of the day. Unfortunately, such fixed installations result in a compromise situation such that the rays do not directly impinge on the collector during certain periods of the day. Therefore, systems have been proposed wherein the solar collector is moved during the day to follow the path of the sun. To achieve the necessary motion or movement of the collector, various types of drive sources and techniques for moving the collector have been used. Perhaps the most acceptable systems to date, include those systems which use a sensor and some sort of electrical motor for positioning the collector in its proper orientation. Unfortunately, such systems often are expensive; whereas, other systems that are available and promise to be somewhat less expensive, provide less than dependable operation. An example of a system using a sensing means and a collector driven by an electrical motor is disclosed in U.S. Pat. No. 4,215,410 issued to Weslow et al. on July 29, 1980. This patent discloses a rather complex system which has an open loop servo controller for controlling an electrical motor which in turn drives the solar energy device about its azimuth and altitude axis for tracking the sun. The controller has a central processor and means for inputting data corresponding to the present day of the year, hour of the day, minute of the hour and the longitude and latitude location of the device. Thus, there is described according to this patent a rather complex controller for controlling the positioning of the collector, which as was mentioned above provides information for driving an electrical motor. U.S. Pat. No. 4,107,521 issued to G. R. Winders, the inventor of the present invention, on Aug. 15, 1978 shows a very effective and much simpler sensing system which is also suitable for driving an electrical motor which moves the collector as necessary to track the sun.

There are also, of course, other techniques for providing the means for moving a solar collector. For example U.S. Pat. No. 4,178,913, issued to J. A. Hutchison on Dec. 18, 1979, discloses a solar collector system which includes a movable surface for receiving the solar radiation. The movement of the collector surface is accomplished by a hydraulic actuated tracking system which includes at least two hydraulic cylinders and pistons which control the orientation of the collector surface.

In addition to hydraulic systems similar to that of Hutchinson there have also been a plethora of pneumatic and hydraulic systems which use either liquid or gas, and in some cases the combination of liquid and gas or liquid vapors for powering the systems. Typically, these systems use liquids which are easily vaporized and thereby provide the driving power by the actual movement and subsequent shifting of weight of the liquid. The weight shifting occurs as the liquid vaporizes in response to the heat created by the tracking of the sun. As examples, U.S. Pat. No. 4,187,123 issued to Richard E. Diggs on Feb. 5, 1980 discloses a controlled array of units which concentrate solar energy by means of lenses which in turn heat water within the system. The hot water is available to provide the necessary work to move the system. Thermocouples and controls are connected with the unit to keep them pointed at the sun for obtaining maximum energy during the daylight hours. Similar patents include U.S. Pat. No. 4,198,954 issued to R. J. Meijer on Apr. 22, 1980. This patent discloses a solar tracking arrangement which includes a pair of sun sensor reservoirs each containing a high pressure working medium. The working medium thermally expands when subjected to solar radiation. Likewise, U.S. Pat. No. 4,079,249 issued to K. P. Glymm on Mar. 14, 1978 discloses motor apparatus for orienting the solar units. The device is so arranged that solar energy strikes surfaces of containers so as to change the distribution of fluid in a system to cause the rotationable parts and an attached solar collector to rotate in an arc so as to follow the sun. U.S. Pat. No. 4,211,212, issued to R. J. Braun on July 8, 1980, discloses a solar reflector of a particular concave parabola shape which is driven so that the apparatus is maintained at all times perpendicular to the solar energy rays. This is accomplished by means of a thermal expandable fluid actuating system which compensate for the sun's seasonal declination.

Thus, from the above patents, it is seen that a great number of techniques and devices have been developed which use the actual solar radiation itself to expand liquids or vaporize liquids such that the expanded liquid or vapor provides the drive force for maintaining the orientation of the device in the proper direction to track the sun. However, substantially all of these devices as discussed are in general very complex and expensive to produce, and would therefore be unacceptably expensive for use with a large array of concentrators.

Referring again to U.S. Pat. No. 4,211,212, discussed above, there is disclosed a sensor and drive device which uses a fluid which is selectively heated by the sun to expand bellows which in turn actuate pawls necessary to turn a geared wheel. The geared wheel in turn drives the necessary moving mechanism. However, as has been discussed, all of these systems require extremely fluid tight systems, complex plumbing, electrical wiring, and other elaborate gearing to drive the system. The complexity of the existing systems distracts from the feasibility and economic use of solar powered collectors, and especially for use with large arrays of concentrators.

Therefore, it is an object of this invention to provide apparatus which is simple and inexpensive to build and maintain and which does not require electrical wiring or elaborate plumbing.

It is a further object to provide simple and inexpensive apparatus which allows for reliable and precision synchronized sun tracking by a large field or array of concentrators.

Although most of the systems disclosed in the U.S. Patent discussed heretofore reveal various combinations of systems which use the sun's rays to heat a fluid or liquid to provide the necessary tracking action, it will be appreciated that to date electrical sensing systems for driving electrical motors have often been found to be the most effective. For example, the very elaborate solar tracking system discussed heretoabove with respect to U.S. Pat. No. 4,215,410 issued to Westlow et al., discloses a elaborate and complex tracking system which in turn provides electrical control signals for controlling the apparatus for moving the collector. Likewise, the very effective and simple system disclosed in U.S. Pat. No. 4,107,521 to Winders also discloses an apparatus which provides electrical signals for controlling electric motors for moving a system as necessary to track the sun. To date, such sensors have been used substantially exclusively for providing electrical control signals as necessary to control electrical motors which power the collecting devices. It will be appreciated, of course however, that the control information provided by these electrical control signals need not be restricted to only drive electrical motors. That is, less expensive systems to provide the motivating power could be also controlled by such electrical control signals.

Therefore, it is another object of the present invention to provide simple and inexpensive moving or positioning means responsive to electrical control signals for moving an array or large field of solar concentrator so as to track the sun.

It is still another object of this invention to provide an accurate driving system which is simple to maintain, which is unaffected by the weather, and which will continue to operate as long as necessary to provide a shut down or detracking in the event of a power failure.

DISCLOSURE OF THE INVENTION

Other objects and advantages will in part be obvious, and will in part appear hereinafter, and will be accomplished by the present invention which provides apparatus and methods for providing a drive system for a solar concentrator or preferably a large field of solar concentrators to track the sun by means of pneumatic pulses. The apparatus and methods comprise gearing means mounted to each solar concentrator for moving the solar concentrator as necessary to track the sun. The gearing means itself is connected to a drive means which is driven by pulses of compressed air received from a source of compressed air. Pulses to each of the concentrators are provided by pneumatic valving which in turn is controlled by electric drive signals. In a preferred embodiment, the gearing means includes a worm wheel and a worm gear, wherein the worm wheel rotates one full revolution for every sixty revolutions of the worm gear. The drive means in the preferred embodiment includes a ratchet wheel driven by a ratchet pawl. In the preferred embodiment, the ratchet wheel contains thirty-six teeth such that when the drive means and the gearing means are combined ten minutes of arc movement of the solar concentrator will result. The drive means is connected to the pneumatic valving which in turn is connected to the source of compressed air by a simple fluid connecting conduit which in a preferred embodiment may simply be a plastic tubing. Also, it should be noted, that in a preferred embodiment, the drive means may include two ratchet and pawl combinations such that the solar concentrator may be driven in either direction. For example, daily re-synchronization of the system may be achieved at the end of each day by driving all of the concentrators against an adjustable stop at the most easterly position. The valving means itself is controlled by electrical circuitry such as for example simple relays. Of course, instead of relays other electronic switching could be used as desired. Control circuitry itself operates in response to any suitable sensing means which can be used to track the sun as it crosses the sky and which in turn will provide the necessary electrical control signals to drive the control circuitry.

BRIEF DESCRIPTION OF THE DRAWINGS

The above mentioned features of the present invention will be more clearly understood from the consideration of the following description in connection with the accompanying drawings in which:

FIG. 1 is a part pictorial and part block diagram of a solar collector drive system incorporating the features of this invention.

FIG. 2 is a block diagram showing the embodiment of an electrical schematic and pneumatic schematic including the features of this invention.

BEST MODE FOR CARRYING OUT THE INVENTION

Figure 3:
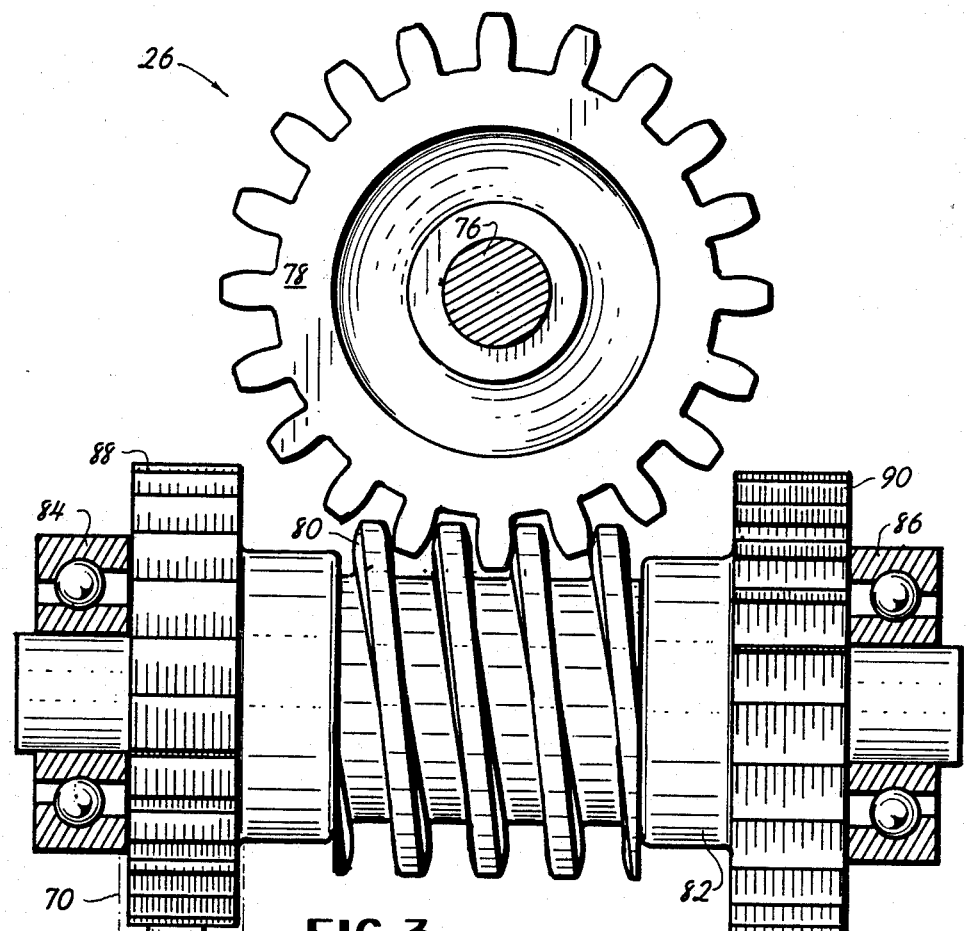
FIG. 3 is an elevation view of a preferred embodiment of gearing means suitable for use with this invention.

Referring now to FIG. 1, there is shown a part pictorial and part block diagram of a solar system incorporating the pneumatic drive of this invention. As shown, a selected number of solar collectors 10, 12, N-1, and N are arranged to receive the rays of the sun 14 as it follows an arcuate path across the sky indicated by arrow 16. Although the pneumatic drive system for solar collectors of this invention may be used for any number of solar concentrators, it is especially suitable for use with a large field or array of solar concentrators numbering sixteen or more. It will also be appreciated, of course, that since the sun is substantially at an infinite distance from each of the concentrators, the sun rays may be considered parallel, and therefore the concentrators must be precisely synchronized or driven substantially in unison to track the sun as it begins its travel in the eastern sky and moves to the western sky. Although this invention will be discussed with respect to rotation or movement of a concentrator such that east and west tracking is provided, it will also be appreciated that the same technique could be used for providing altitude correction so as to better track the sun in the winter sky, and the summer sky.

As shown in FIG. 1, each of the concentrators 10, 12, N-1, N, etc. in this embodiment substantially comprise a parabolic reflector 18 which reflects the parallel rays 20 of the sun onto a target member such as tubing 22 which for example is suitable for carrying a fluid such as water or other heat transfer media. To insure maximum efficiency, the parabolic reflector 18 is pivoted such that it rotates in the direction indicated by arcuate arrow 24 as necessary to track the sun as it moves across the sky. Concentrator 10 further includes a gearing means 26 which provides the necessary motion and power to rotate reflector 18 in the direction indicated by arrow 24. Gearing means 26 is itself connected to and powered by a drive means 28 which is responsive to pulses of compressed air as will be discussed hereinafter. As can be seen, the pulses of compressed air are provided to drive means 28 from pneumatic valving means 32 by means of a fluid conduit 34 and 35. As can also be seen, a large field of additional concentrators such as concentrators 10, N-1 and N, similarly include gearing means 26A, 26N-1 and 26N and drive means 28A, 28, N-1, and 28N which also receive pulses of compressed air from pneumatic valving means 32 by conduits 34 and 35. It is also appropriate to understand that the pneumatic drive system of the present invention is especially suitable for a large field or array which contains at least sixteen concentrators. As one of the features of this invention, it will be appreciated that rather than requiring extensive and complex plumbing or electrical wiring, conduit 34 may simply include a plastic or p.v.c. (polyvinylchloride) tubing which is slipped over necessary fittings at the drive means 28 and the pneumatic valving means 32 of each concentrator for providing the pulses of compressed air. In addition, it is seen that the pneumatic valving means 32 receives the supply of compressed air by means of a second conduit 36 from a source 38 of compressed air. The compressed air in compressed air source 38 is preferably generated such that at least some compressed air will be available for operation even in the event there is a power failure. As was the case with the plastic conduits 34 and 35, conduit 36 may also be plastic tubing for carrying the compressed air. In addition, pneumatic valving means 32 is preferably electrically controlled by electrical signals from control circuitry 40 and carried by means of an electrical cabling or wiring 42. Thus, it will be appreciated that the electrical control signals are provided to pneumatic valving 32 for opening and closing pneumatic valves in response to the electrical control signals. Also required is an electrical power source 44 for providing the necessary electrical power to the control circuitry and also for providing any required power to sensing means 46. The pneumatic drive system of the present invention will operate satisfactorily with any available power source having the required voltage and which is able to provide the necessary current. However, to assure emergency shut down or detracking operation in the event of major power failure according to a preferred embodiment, nickle-cadium (NI-CD) rechargable batteries are preferably used to operate the controls and solenoid valves. Sensing means 46 may be any suitable sensing means. However, a particularly suitable sensing means is disclosed in the Winders U.S. Pat. No. 4,107,521. This sensing means will provide the necessary electrical control signals to control circuitry 40. Thus, to this point there has been described a summary discussion of the operation of the pneumatic drive solar tracking system of the present invention.

Referring now to FIG. 2, there is disclosed a block electrical and pneumatic schematic which includes the features of this invention. It will be appreciated that components in this FIG. 2 which are the same as those in FIG. 1 are represented by the same reference numbers. Thus, as shown in the preferred embodiment, gearing means 26 is driven by the drive means 28 which is a pawl and ratchet wheel arrangement as will be discussed in detail hereinafter. The pawls used to drive the ratchet wheel are themselves powered by pneumatic pulses received or carried by conduits 34 and 35. In the embodiment shown, there are shown two pawl and ratchet wheel systems such that the rotation can be in either a west to east direction or a east to west direction. The west to east drive is preferably operated in response to a "sleep sensor" for purposes of moving the collector back to its most easterly position at the end of the day so that it will be in position to follow the sun at sunrise the next day. Also, it will be appreciated that as discussed heretofore, the system is particularly suitable for a large field or array of concentrators numbering sixteen or more, but any desired number of concentrators may be included and the only requirement is that conduits 34 and 35 which carry the pneumatic pulses be provided from the pneumatic valving means 32 to the individual gearing and driving means attached to each collector. In FIG. 2, as shown, pneumatic valving means 32 includes pneumatic valves which are powered by a low voltage source such as for example a 12 volt battery or other source. These valves are typically solenoid driven valves 50 and 52 which are opened and closed by solenoids 54 and 56 such that the supply of compressed air from source 38 is momentarily supplied to the air cylinders of pawl and ratchet wheel drive means 28. The solenoids 54 and 56 are themselves driven by any suitable means such as for example pulsing relays 58 and 60. As shown, pulsing relays 58 and 60 are controlled by sensing unit 46 which will sometime include an east sensor 62, as well as the usual west sensor 64 and a return or "Sleep Sensor" 66. Thus, when the sensing system 46 senses that the collector needs to be driven in a more westerly direction, an electrical signal will be provided to pulsing relay 58 which will momentarily close and provide power to solenoid 54 which in turn will momentarily open pneumatic valve 50 and provide a pulse of compressed air to the air cylinder 68 of pawl 70, (See FIG. 4 for detail), thereby resulting in an incremental western movement. At the end of the day, sun down, or at least before sunrise the next day, the "Sleep Sensor" 66 may operate in conjunction with an adjustable easterly "stop" to provide daily re-synchronization to each of the concentrators in the array. This is accomplished by adjusting the easterly stop such that all of the concentrators are synchronized and precisely adjusted when driven against the stop.

Control circuitry 40 is shown as being a pair of pulsing relays which are responsive to sensing unit 46, however, it will be appreciated that control circuitry 40 could include any type of complex control cicuitry including a microprocessing system, solid state switching or a programmed system which carefully computes the day, hour, latitude and longitude, etc. as necessary for maintaining strict and precise movement of the collector. However, it has been found that an effective system which is inexpensive can be achieved by the use of simple pulsing relays such as relays 58 and 60. Finally, sensing unit 46 although preferably a unit such as that shown in U.S. Pat. No. 4,107,521 and discussed heretofore may also be any suitable sensing unit which provides electrical pulses which can be used to controls relays or other electrical controlled circuitry and which in turn controls pneumatic drive system such as pneumatic valves 50 and 52.

Figure 4:
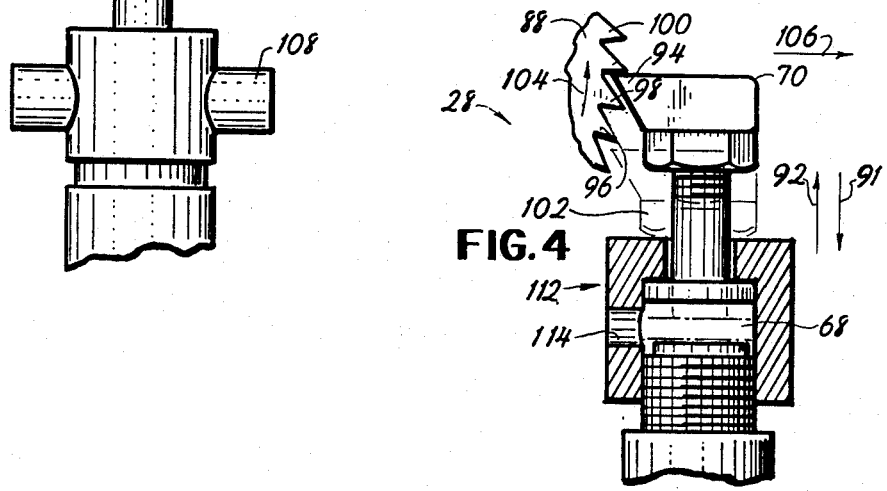
FIG. 4 is an elevation view of the ratchet pawl and ratchet wheel according to an embodiment of this invention.

Referring now to FIGS. 3 and 4 together, there is shown the gearing means 26 and drive means 28 used with each concentrator in an array or field of concentrators, which are responsive to pulses of compressed air and which disclose a preferred embodiment of the features of this invention. Collector 10 (not shown in FIGS. 3 or 4) is driven by a drive shaft 76 which in turn is mounted to a worm wheel 78. Worm wheel 78 is driven by worm gear 80 which is attached to a shaft 82. Shaft 82 is itself supported by bearing 84 and 86. Also as shown, shaft 82 is fixedly mounted to a ratchet wheel 88. In FIG. 3, as shown, in addition to ratchet wheel 88, there is also an east driving ratchet wheel 90 which operates the same as the west ratchet wheel 88 and pawl 70 to be discussed hereinafter. Therefore, since the only difference is the direction of rotation provided to shaft 82 which difference in direction in turn reverses the direction of the solar concentrator, this ratchet wheel 90 and its associated components will not be discussed in detail. Therefore, referring again to ratchet wheel 88, it will be appreciated that ratchet wheel 88 is driven by ratchet pawl 70 which moves in a reciprocating direction as indicated by arrows 91 and 92. As shown, driving tip 94 of pawl 70 engages each of the multiplicity of teeth 96, 98 and 100 as shown for illustration only on ratchet wheel 88. Also as shown, by the phantom lines 102, ratchet pawl 70 normally in the position shown by phantom lines 102 upon receiving the pulse of compressed air is moved in the direction 92 by said pulse of compressed air and thus rotates ratchet wheel 88 in the direction indicated by arcuate arrow 104. At the end of the pulse of compressed air, pawl 70 moves in the direction of arrow 91 such that the driving tip 94 of ratchet 70 passes the various teeth on ratchet gear 88 such as tooth 98. It will be appreciated, of course, that for ratchet pawl 70 to pass tooth 98, ratchet pawl 70 must move away from ratchet wheel 88 as indicated by arrow 106. To accomplish this, the gearing mechanism includes a pivot trunion 108 as clearly shown in FIG. 3 to allow cylinder 68 to move as indicated by arrow 106, and a biasing spring 110 to return cylinder 68 to its operating position. Thus, it will be appreciated that a series of pulses of compressed air to cylinder 68 will result in a reciprocating action of ratchet pawl 70 which in turn will incrementally move ratchet wheel 88 in the direction indicated by arcuate arrow 104. As shown in FIG. 4, the movement of ratchet pawl 70 is typically accomplished by a cylinder piston combination 112 which receives the pulse of compressed air at the port 114 such that the compressed air moves the piston in the desired direction and once the compressed air pulse has ended, the piston will return to its rest position.

In the preferred embodiments of the present invention and as was discussed hereinabove, the solar concentrator of this invention includes a second ratchet wheel 90 and associated components to drive the concentrator in the opposite direction. For example, at the end of the day the field of concentrators must be returned to the most easterly position to be in position to start tracking the rising sun the next day. Therefore, to move ratchet wheel 90 in the direction opposite to that shown by arcuate arrow 104, ratchet pawl 116 and a second air cylinder 118 for moving ratchet pawl 116 are included. Spring 120 is attached to air cylinders 118 in the same manner that spring 110 was attached to cylinder 68 to provide biasing action to return cylinder 118 to the operating position after it has pivoted out of the way during the stepping action.

Thus, it will be appreciated that there has been described a pneumatic drive system which is particularly suited for use with a large array of concentrators, and which requires little maintenance, includes high reliability, low cost, and requires no electrical installation to the individual collector units. A particular embodiment which will provide the necessary movement of the concentrators operates by receiving as few as two air pulses per minute, the gearing ratio for worm wheel 78 and worm gear 80 is 60 to 1, and the ratchet wheel 88 includes 36 teeth. Such a gearing combination, will result in approximately a ten minute of arc change of the solar concentrators for each incremental stepping of the ratchet pawl 70.

Thus, although the present invention has been described with specific methods and apparatus for providing a pneumatic drive system for a solar concentrator, it is not intended that such specific references be considered as limitations upon the scope of this invention except insofar as is set forth in the following claims.

I claim:

1. A drive system for positioning a solar concentrator comprising:

gearing means mounted to a solar concentrator for moving said solar concentrator to track the sun;

drive means responsive to pulses of compressed air connected to and for driving said gearing means;

a source of compressed air;

pneumatic valving responsive to electrical drive signals for selectively providing pulses of compressed air to said drive means;

first and second conduits, said first conduit connected between said source of compressed air and said pneumatic valving means to provide compressed air to said pneumatic valving, said second conduit connected between said pneumatic valving means and said drive means to carry said pulses of compressed air from said valving means to said drive means;

master control circuitry responsive to an input control system for providing said electrical drive signals to said pneumatic valving;

sensing means for monitoring the position of the sun, and for providing said input control signals to said master control circuitry such that said solar concentrator is selectively moved to track the movement of the sun.

2. The drive system of claim 1 wherein said drive means includes a first portion for driving said gearing means in a first direction, and a second portion for driving said gearing means in a second direction.

3. The drive system of claim 1 wherein said drive means includes a ratchet wheel suitable for rotation around its center axis, a ratchet pawl, and an air cylinder/piston combination arranged such that said ratchet pawl is moved by the piston of said cylinder-piston combination when said cylinder-piston combination receives a pulse of compressed air, and said ratchet pawl incrementally rotates said ratchet wheel around said center axis.

4. The drive system of claims 1, 2 or 3 wherein said gearing means includes a worm wheel driven by a worm gear connected to said drive means.

5. The drive system of claim 4 wherein said ratchet wheel includes thirty-six teeth and wherein said worm gear rotates sixty times per every single rotation of said worm wheel.

6. The drive system of claims 1, 2 or 3 wherein the system is connected to drive a multiplicity of solar concentrators, and said drive means and said gearing means include a multiplicity of drive means and gearing means connected one each to said multiplicity of solar concentrators and responsive to pulses of air from said pneumatic valving.

7. The drive system of claim 5 wherein the system is connected to drive a multiplicity of solar concentrators, and said drive means and said gearing means include a multiplicity of drive means and gearing means connected one each to said multiplicity of solar concentrators, and responsive to pulses of air from said pneumatic valving.

8. The drive system of claims 1, 2 or 3 wherein said sensing means includes a west sensor for incrementally driving said solar concentrator, and a "Sleep Sensor" for re-synchronizing said system before sunrise the next day.

9. The drive system of claims 1, 2 or 3 and further including a source of electrical power for use by said control circuitry and for driving said pneumatic valving.

10. A method of positioning a solar concentrator comprising the steps of:
mounting a solar concentrator to gearing means for moving said solar concentrator to track the movement of the sun;
driving said gearing means in response to pulses of compressed air;
selectively opening and closing pneumatic valving for providing pulses of compressed air to said drive means in response to electrical drive signals;
providing electrical drive signals to said pneumatic valving in response to electrical control signals, and
providing electrical control signals representative of the movement of the sun across the sky.

11. The method of claim 10 wherein said step of driving said gearing means includes driving said gearing means in a first and second direction.

12. The method of claims 10 or 11 wherein selectively providing pulses of compressed air includes providing pulses to a multiplicity of driving means for driving a multiplicity of solar concentrators.

* * * * *